United States Patent
Cho

(10) Patent No.: US 12,424,651 B2
(45) Date of Patent: Sep. 23, 2025

(54) APPARATUS FOR PICKING AND PLACING BATTERY CELL ELEMENTS AND HIGH SPEED STACKING APPARATUS INCLUDING SAME

(71) Applicant: HANA TECHNOLOGY CO., LTD., Yongin-si (KR)

(72) Inventor: Gi Bong Cho, Yongin-si (KR)

(73) Assignee: HANA TECHNOLOGY CO., LTD., Yongin-si (KR)

( * ) Notice: Subject to any disclaimer, the term of this patent is extended or adjusted under 35 U.S.C. 154(b) by 548 days.

(21) Appl. No.: 17/813,660

(22) Filed: Jul. 20, 2022

(65) Prior Publication Data
US 2023/0420720 A1    Dec. 28, 2023

(30) Foreign Application Priority Data
Jun. 28, 2022    (KR) .................. 10-2022-0079015

(51) Int. Cl.
*H01M 10/04*    (2006.01)
*H01M 4/139*    (2010.01)

(52) U.S. Cl.
CPC ....... *H01M 10/0404* (2013.01); *H01M 4/139* (2013.01)

(58) Field of Classification Search
None
See application file for complete search history.

(56) References Cited

U.S. PATENT DOCUMENTS

| | | | | |
|---|---|---|---|---|
| 5,724,861 A | * | 3/1998 | Mang ................. | B23Q 5/342 74/567 |
| 2012/0180424 A1 | * | 7/2012 | Hinshaw .............. | E04B 1/26 700/95 |

FOREIGN PATENT DOCUMENTS

| | | | | |
|---|---|---|---|---|
| EP | 3872912 A1 | | 1/2021 | |
| KR | 10-1140447 | | 4/2012 | |
| KR | 102120799 B1 | * | 6/2020 | ........ H01M 10/0404 |
| KR | 102303834 B1 | | 9/2021 | |

OTHER PUBLICATIONS

Machine English translation of KR1021200799 (Year: 2020).*

* cited by examiner

*Primary Examiner* — Jeffrey T Barton
*Assistant Examiner* — Karen J. Armstrong
(74) *Attorney, Agent, or Firm* — Central California IP Group, P.C.; Andrew D. Fortney

(57) ABSTRACT

An apparatus for picking and placing battery cell elements, and a high-speed stacking apparatus including the same are proposed. In detail, an apparatus for picking and placing battery cell elements, the apparatus automatically and alternately stacking a cathode plate and an anode plate, which are fed by a cathode plate feeder and an anode plate feeder, in gaps of a separator, which is folded and provided in a zigzag manner, and a high-speed stacking apparatus including the apparatus for picking and placing battery cell elements.

12 Claims, 17 Drawing Sheets

APPARATUS FOR PICKING AND PLACING BATTERY CELL ELEMENTS AND HIGH SPEED STACKING APPARATUS INCLUDING SAME

CROSS REFERENCE TO RELATED APPLICATION

The present application claims priority to Korean Patent Application No. 10-2022-0079015, filed Jun. 28, 2022, the entire contents of which is incorporated herein for all purposes by this reference.

BACKGROUND OF THE INVENTION

Field of the Invention

The present disclosure relates to an apparatus for picking and placing battery cell elements, and a high-speed stacking apparatus including the same. In more detail, the present disclosure relates to an apparatus for picking and placing battery cell elements, the apparatus automatically and alternately stacking a cathode plate and an anode plate, which are fed by a cathode plate feeder and an anode plate feeder, in gaps of a separator, which is folded and provided in a zigzag manner, and a high-speed stacking apparatus including the apparatus for picking and placing battery cell elements.

Description of the Related Art

Recently, research about a secondary battery that is a high-performance battery that can be repeatedly charged and discharged has been actively conducted with full-scale development of electric vehicles, storage batteries for storing energy, robots, satellites, etc. At present, as commercialized batteries, there are a nickel-cadmium battery, a nickel-hydrogen battery, a nickel-zinc battery, a lithium-ion battery, etc. Of these batteries, since the lithium-ion battery hardly generates a memory effect in comparison to nickel-based secondary batteries, it is spotlighted as a secondary battery having the advantage of free charging/discharging, a very low self-discharge rate, and high energy density.

These secondary batteries are configured with a cathode plate, a separator, an anode plate sequentially stacked and emerged in an electrolyte solution, and the method of manufacturing such internal cell stack of secondary batteries is classified into two types in a broad meaning. The first one is a method of sequentially stacking an anode plate, a separator, a cathode plate, and a separator and then winding them in a jelly-roll shape, and the second one is a method of cutting an anode plate and a cathode plate in a desired size and the alternately stacking the anode plate, a separator, the cathode plate, and a separator. In order to manufacture a high-capacity or large-size secondary battery, the second one, that is, the stacking type is advantageous in terms of the life span and space efficiency of a battery, so the stacking type is increasingly employed for electric vehicles.

FIG. 1 is a schematic view showing an internal cell stack of a secondary battery manufactured in a Z-stacking type, FIG. 2 is a plan view showing a Z-stacking type stacking apparatus of the related art, and FIGS. 3*a* and 3B are schematic views showing an operation example of the Z-stacking type stacking apparatus of the related art.

There are several methods of manufacturing the internal cell (an assembly of electrodes and separators) of a secondary battery using the stacking type. Of these methods, a method of folding a continuous separator in a zigzag manner and simultaneously alternately stacking cathode plates A and anode plates B in gaps of the folded separator, as shown in FIG. 1, is called Z-folding & stacking, or briefly, Z-stacking.

As an apparatus for manufacturing the internal cell of a secondary battery in the Z-stacking type, in general, cell manufacturing apparatuses that stack materials by straightly reciprocating and a vertically moving up and down an apparatus on which materials such as electrode plates and a separator are stacked and an apparatus that conveys electrodes to a stacking position have been used the most.

According to such Z-folding & stacking apparatuses, as shown in FIGS. 2 and 3, cathode plates A and anode plates B are stacked on individual tables T spaced left and right, a stage S on which the cathode plates A and the anode plates B are placed is installed to horizontally reciprocate between the individual tables T, and a robot R is configured to be able to alternately pick up, convey, and stack the cathode plates A and the anode plates B, which are on the tables T, onto a separator C that is released and folded on the stage S.

However, according to such a Z-stacking type of the related art, since the stage S moves long distances to the left and right, there is a problem working takes long time, and accordingly, productivity decreases. Further, when the operation speed of the apparatus is increased to reduce the working time, there is a problem that position precision of the apparatus is not secured due to a rapid increase of vibration and noise and stacking precision between electrodes is not secured due to shaking of the stacked materials while the stage S repeats reciprocating and stopping.

As a method of solving this problem, it is possible to reduce the operation steps for folding a separator and somewhat decrease the transfer distance of electrodes as well by tilting (rotationally reciprocating) a stage (table) in order to alternately stack electrodes through a high-speed cell stack manufacturing apparatus.

However, since such a cell stack manufacturing apparatus tilts (rotationally reciprocates) a heavy stacking stage, shock is generated in the driving process, so there is a problem that the lifespan decreases due to high fatigue of the parts that are used for tilting (rotational reciprocating), which is unnecessarily accompanied by a side effect that the higher the driving speed, the more severe the problem becomes. Further, since stacking is still performed through repeated transferring and stopping except that the straight reciprocation motion of the stage on which materials are stacked is changed to a rotational reciprocation (tilting) motion, the possibility of damage to the stacking precision between electrodes still remains.

Further, it was attempted to increase a speed by rotationally reciprocating (tilting) an electrode transfer apparatus or to prevent damage to a cell quality in high-speed driving by moving a stack stage along a curve rather than straightly moving the stack stage in the related art, but the problem that a stack stage has to be reciprocated was not solved. Further, it was disclosed to rotationally reciprocate (tilt) an electrode transfer apparatus and an electrode arrangement apparatus with a stack stage fixed in the related art, but it is still not easy to secure both a high speed and stack precision.

Meanwhile, secondary battery manufacturers need many apparatuses due to expansion of the field of electric vehicle, so they want to increase the speed and performance of a Z-stack machine (Z-stack equipment) that occupies a wide space and accounts for a high investment ratio, and are attempting to solve the problem that productivity decreases due to an increase in size of secondary batteries.

Further, electric vehicle manufacturers request to increase the size of secondary batteries in order to gradually increase a mileage by securing larger electricity charge capacity in the same space. Accordingly, secondary battery manufacturers request equipment that can solve the problem that the production speed of cell stack equipment decreases and precision of products is deteriorated due to an increase in size of batteries. Further, as the number of equipment increases due to an increase of an output, it is required to develop equipment that can secure a visual field for management well and can easily maintain facility precision.

DOCUMENTS OF RELATED ART

Patent Document (Patent document 1) Korean Patent No. 10-1140447

SUMMARY OF THE INVENTION

The present disclosure has been made in an effort to solve the problems in the related art described above and an objective of the present disclosure is to provide a high-speed stacking apparatus for battery cell elements that prevents misarrangement of electrodes that are stacked on a stack table in a stacking process by configuring the stack table not to move in an x-axis direction and rotationally reciprocate.

Another objective of the present disclosure is to provide an apparatus for picking and placing battery cell elements that can increase the speed of a stacking process by not sequentially performing two individual operations such as moving-up/down and lateral moving because the apparatus is configured to rotationally reciprocate between a stack table and an electrode feeder (an anode plate feeder or a cathode plate feeder), and a high-speed stacking apparatus including the apparatus for picking and placing battery cell elements.

Another objective of the present disclosure is to provide an apparatus for picking and placing battery cell elements that enables a suctioner to always maintain an initial setting angle because a lower pulley is fixed and an upper pulley is formed to have substantially the same pitch circle diameter as the lower pulley, and a high-speed stacking apparatus including the apparatus for picking and placing battery cell elements.

Another objective of the present disclosure is to provide an apparatus for picking and placing battery cell elements that prevents misarrangement of electrodes by minimizing vibration in rotational reciprocation of a suctioner and a rotary shaft because an actuator is directly connected to the rotary shaft, and a high-speed stacking apparatus including the apparatus for picking and placing battery cell elements.

Another objective of the present disclosure is to provide a high-speed stacking apparatus for battery cell elements that enables a worker to easily secure a visual field and conveniently perform a maintenance process because an actuator and a roller rotator are disposed at the lower portion of the entire equipment.

In order to achieve the objects, the present invention may be accomplished by an embodiment having the following configuration.

According to an embodiment of the present disclosure, an apparatus for picking and placing battery cell elements according to the present disclosure includes: a pivot shaft that is a shaft member coupled to an operation link and connected to an actuator; the operation link coupled to the pivot shaft and a rotary shaft and configured to be rotationally reciprocated by the actuator; the rotary shaft that is a shaft member coupled to the operation link and having a suctioner coupled to a side thereof; the suctioner coupled to the rotary shaft and configured to suction an electrode; and the actuator operating to rotationally reciprocate the operation link.

According to another embodiment of the present disclosure, in the apparatus for picking and placing battery cell elements according to the present disclosure, the actuator may be directly connected to the operation link.

According to another embodiment of the present disclosure, in the apparatus for picking and placing battery cell elements according to the present disclosure, the actuator may be a direct drive motor (DD motor) and may be directly connected to the operation link, and an outer surface of the actuator may rotate such that the operation link rotationally reciprocates.

According to another embodiment of the present disclosure, in the apparatus for picking and placing battery cell elements according to the present disclosure, the actuator may be a cam-typed oscillating type index drive and may be directly connected to the operation link.

According to another embodiment of the present disclosure, in the apparatus for picking and placing battery cell elements according to the present disclosure, the actuator may further include: rotary motor; and a reducer connecting the rotary motor and the index drive to each other.

According to another embodiment of the present disclosure, the apparatus for picking and placing battery cell elements according to the present disclosure may further include: a lower pulley installed and fixed to an outer surface of the pivot shaft; an upper pulley configured to rotate with the rotary shaft on an outer surface of the rotary shaft; and a belt connecting the lower pulley and the upper pulley to each other.

According to another embodiment of the present disclosure, the apparatus for picking and placing battery cell elements according to the present disclosure, the lower pulley may be installed and fixed regardless of rotation of the pivot shaft by a bracket fixed to the ground.

According to another embodiment of the present disclosure, in the apparatus for picking and placing battery cell elements according to the present disclosure, the upper pulley and the lower pulley may have substantially the same pitch circle diameter.

According to another embodiment of the present disclosure, a high-speed stacking apparatus for battery cell elements according to the present disclosure includes: a stack table having a top on which a cathode plate, a separator, and an anode plate are sequentially stacked; an anode plate feeder configured to feed the anode plate to an anode transfer apparatus; a cathode feeder configured to feed the cathode to a cathode plate transfer apparatus; and a pair of electrode transfer apparatus configured to rotationally reciprocate with the stack table and the anode plate feeder therebetween and the stack table and the cathode plate feeder therebetween.

According to another embodiment of the present disclosure, in the high-speed stacking apparatus for battery cell elements according to the present disclosure, the stack table may be fixed at a predetermined position in an x-axis direction.

According to another embodiment of the present disclosure, in the high-speed stacking apparatus for battery cell elements according to the present disclosure, the electrode transfer apparatus may include: a pivot shaft that is a shaft member coupled to an operation link and connected to an actuator; the operation link coupled to the pivot shaft and a rotary shaft and configured to be rotationally reciprocated by the actuator; the rotary shaft that is a shaft member coupled to the operation link and having a suctioner coupled to a side thereof; the suctioner coupled to the rotary shaft and configured to suction an electrode; and the actuator operating to rotationally reciprocate the operation link and directly connected to the pivot shaft, in which the actuator may include a DD motor or a cam-typed oscillating type index drive.

According to another embodiment of the present disclosure, the high-speed stacking apparatus for battery cell elements according to the present disclosure may further include a separator folder configured to fold a separator, which is fed from above the stack table, in a zigzag manner.

According to another embodiment of the present disclosure, in the high-speed stacking apparatus for battery cell elements according to the present disclosure, the separator folder may include: a reciprocating pivot shaft that is a shaft member coupled to a reciprocation link; the reciprocation link coupled to the reciprocating pivot shaft and a hinge shaft and configured to rotationally reciprocate; the hinge shaft coupled to the reciprocation link and coupled to a guide roller on a side; a pair of guide rollers coupled to an upper end of the reciprocation link and configured to guide a separator, which is fed, therebetween; and a roller rotator operating to rotationally reciprocate the reciprocation link.

According to another embodiment of the present disclosure, in the high-speed stacking apparatus for battery cell elements according to the present disclosure, the roller rotator may be disposed under a stacking surface of the stack table.

According to another embodiment of the present disclosure, in the high-speed stacking apparatus for battery cell elements according to the present disclosure, the roller rotator may include a DD motor or a cam-typed oscillating type index drive.

The present disclosure having the above configuration has the following effects.

Since the stack table is configured not to move in an x-axis direction and rotationally reciprocate, there is an effect of preventing misarrangement of electrodes that are stacked on the stack table in the stacking process.

Further, there is an effect of increasing the speed of the stacking process by not sequentially performing two individual operations such as moving-up/down and lateral moving, because the electrode transfer apparatus is configured to rotationally reciprocate between the stack table and the electrode feeder (the anode plate feeder or the cathode plate feeder).

Further, since the lower pulley is fixed and the upper pulley has substantially the same pitch circle diameter as the lower pulley, there is an effect that the suctioner always maintains the initial setting angle.

Further, since the actuator is directly connected to the pivot shaft, vibration is minimized while the suctioner and the rotary shaft rotationally reciprocate, so there is an effect of preventing misarrangement of electrodes.

Further, there is an effect that a worker can easily secure a visual field and conveniently perform a maintenance process, because the actuator and the roller rotator are disposed at the lower portion of the entire equipment.

Even though not clearly stated herein, the effects expected from the technological characteristics of the present invention and described in the following description and latent effects should be construed as being described in the specification of the present invention.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Hereinafter, embodiments of the present invention will be described in detail with reference to the accompanying drawings. Embodiments of the present invention may be changed in various ways and the range of the present invention should be construed on the basis of claims rather than being limited to the following embodiments. The embodiments are provided as reference to more completely explain the present invention to those skilled in the art.

As used in the specification, a singular term may include a plural term unless another case is stated in the context. Terms "comprise" and/or "comprising" stated herein specify existence of shapes, numbers, steps, operations, members, elements that are stated herein, and/or a group thereof without excluding existence or addition of one or more other shapes, numbers, operations, members, elements, and/or a group thereof.

Hereafter, it should be noted that when a component (or layer) is disposed on another component (or layer), the component may be disposed directly on the another component or another component(s) or layer(s) may be disposed between the components. Further, when a component is disposed directly one or over another component, another component(s) is not positioned between the components.

Further, when a component is positioned "on", "over", "under", "at an upper portion", "at a lower portion", "at a side", or "on a side", it means a relative positional relationship.

Hereafter, when a first configuration and a second configuration are "connected" to each other, it should be understood that not only the components are directly connected, and are indirectly connected through a third configuration.

Figure 1:
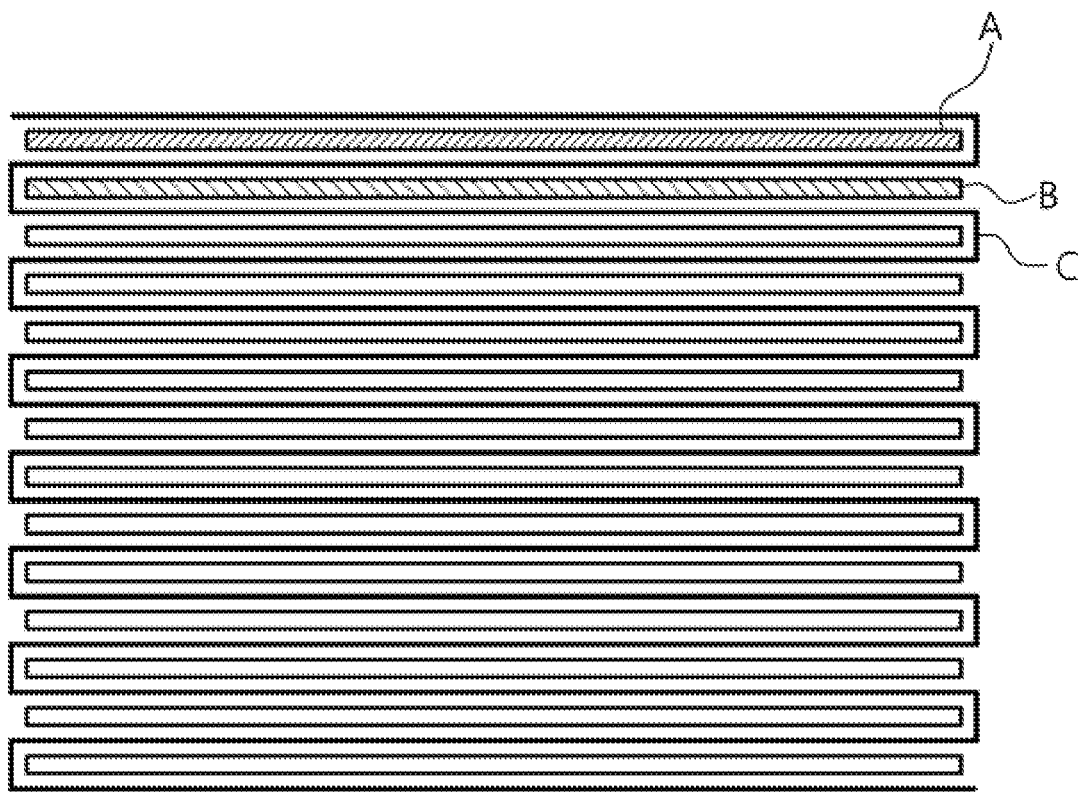
FIG. 1 is a schematic view showing internal cell stack of a secondary battery manufactured in a Z-stacking type.
Figure 2:
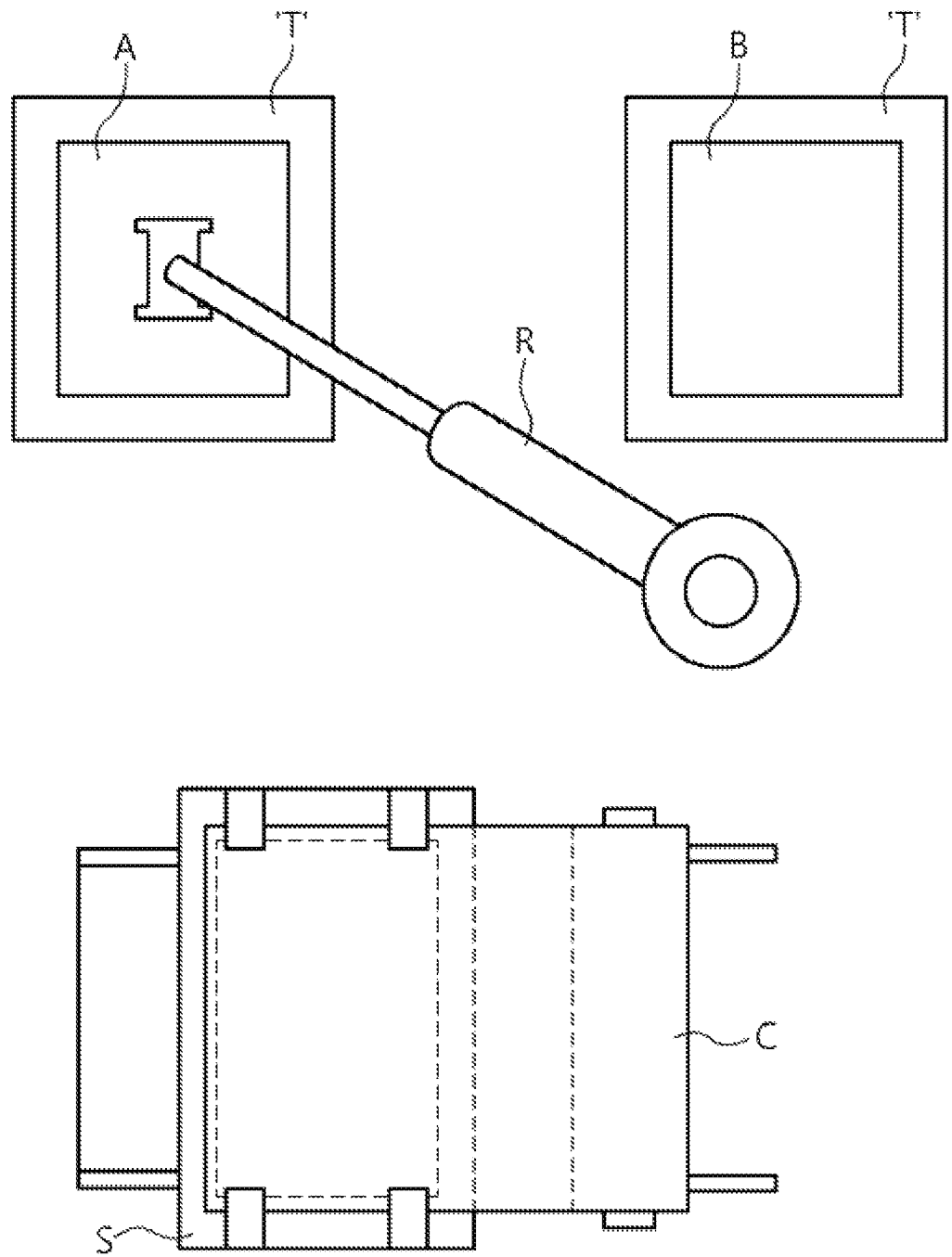
FIG. 2 is a plan view showing a Z-stacking type of stacking apparatus of the related art.
Figure 3A:
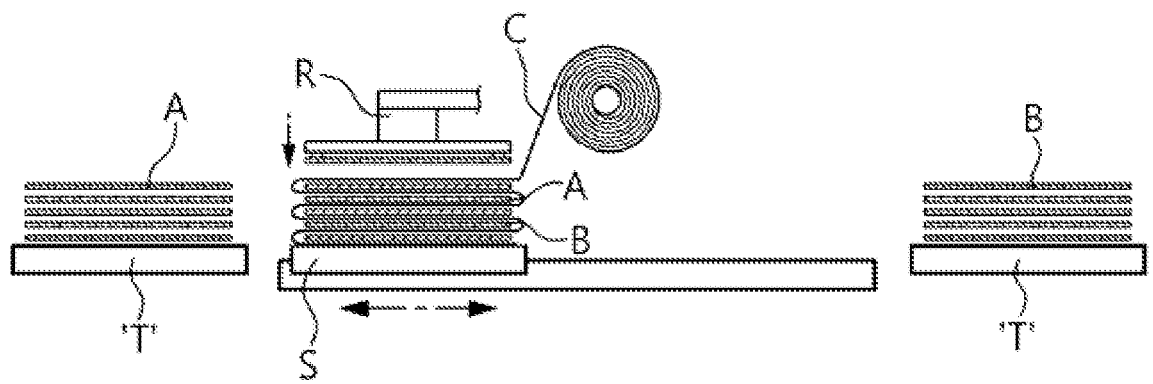
FIGS. 3A and 3B are schematic views showing an operation example of the Z-stacking type of stacking apparatus of the related art.
Figure 3B:
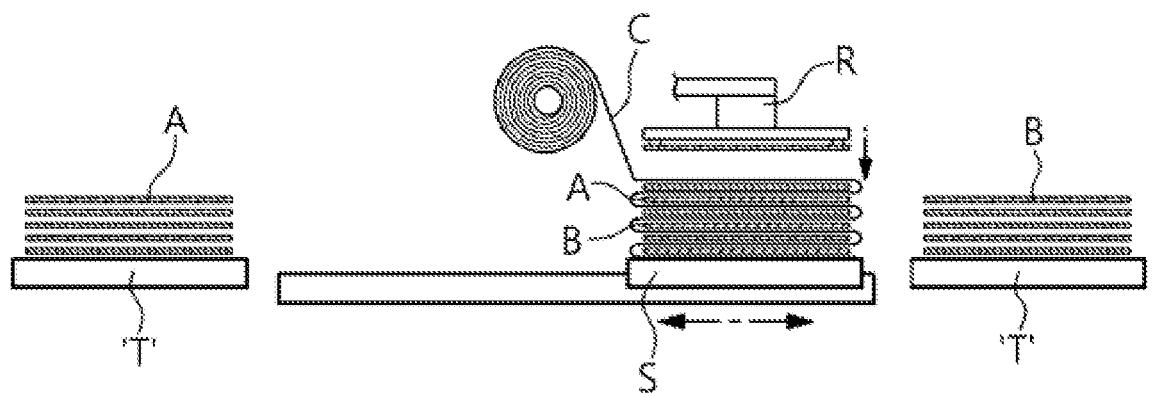
Figure 4:
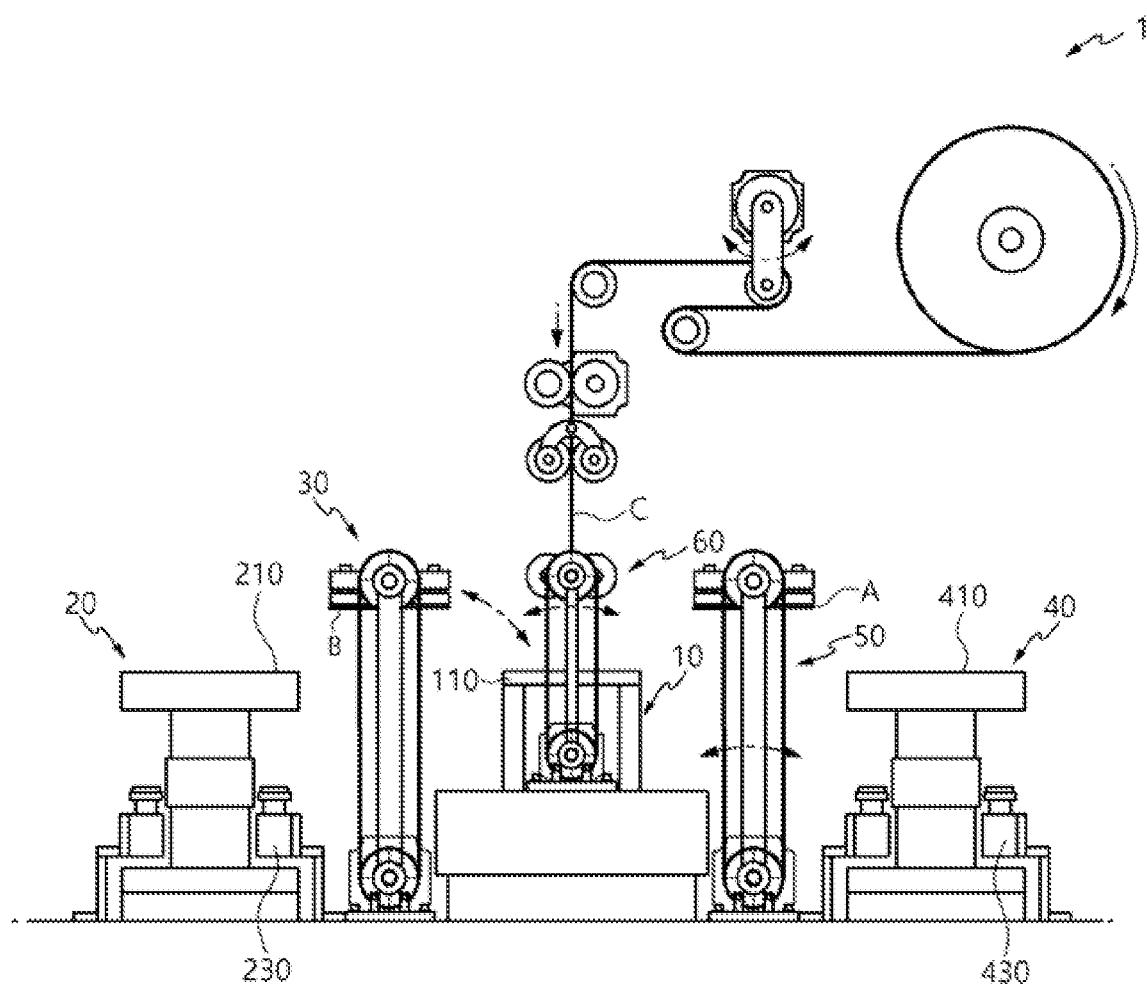
FIG. 4 is a schematic view showing a high-speed stacking apparatus for battery cell elements according to an embodiment of the present disclosure.
Figure 5:
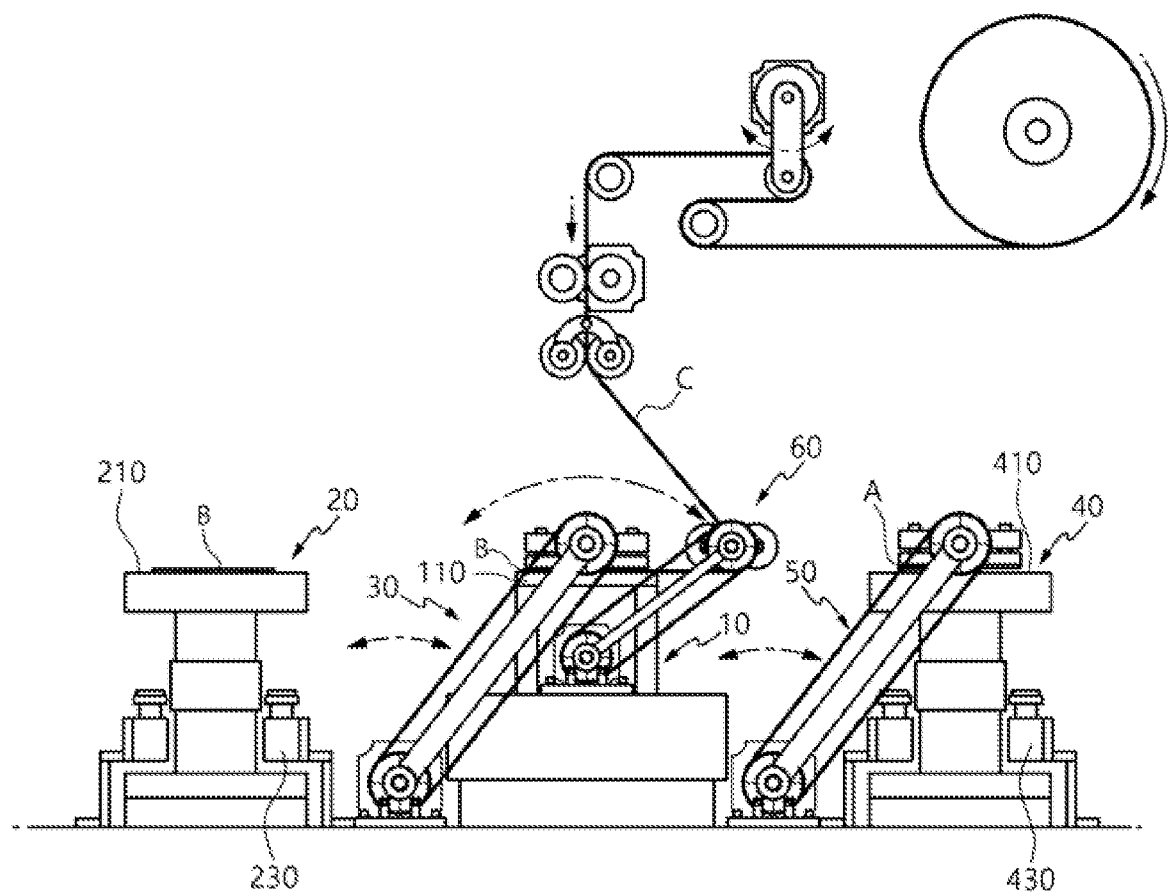
FIGS. 5 and 6 are views showing a use state of the high-speed stacking apparatus for battery cell elements shown in FIG. 4.
Figure 6:
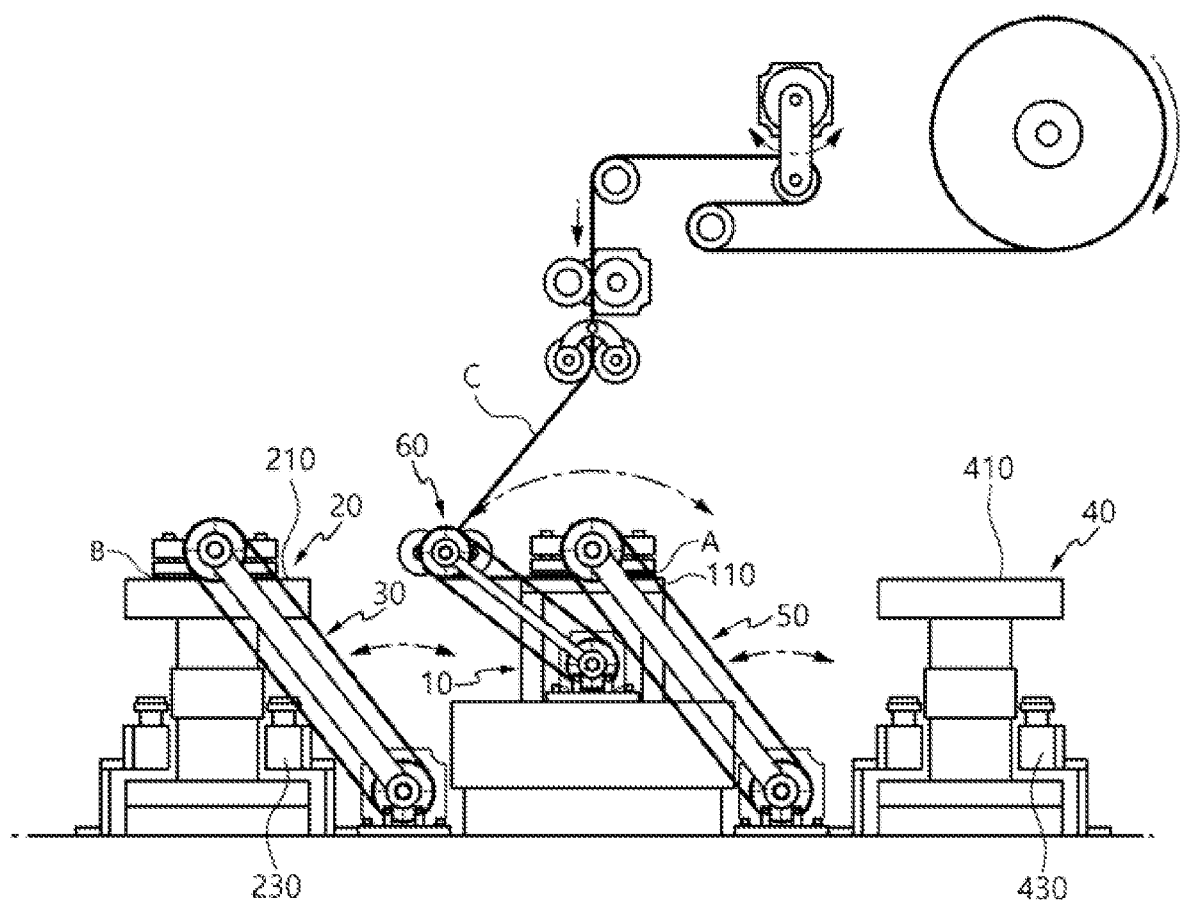

FIG. 4 is a schematic view showing a high-speed stacking apparatus for battery cell elements according to an embodiment of the present disclosure and FIGS. 5 and 6 are views showing a use state of the high-speed stacking apparatus for battery cell elements shown in FIG. 4.

Hereafter, a high-speed stacking apparatus 1 for battery cell elements according to an embodiment of the present disclosure is described in detail with reference to the accompanying drawings.

Referring to FIGS. 4 to 6, the present disclosure relates to a high-speed stacking apparatus 1 for battery cell elements and, more particularly, a high-speed stacking apparatus 1 for battery cell elements that automatically alternately stacking cathode plates A and anode plates B in gaps of a separator C, which is folded and provided in a zigzag manner, with a stack stable fixed, using a cathode plate feeder and an anode plate feeder. That is, a separator C, a cathode plate A, a separator C, and an anode plate B can be sequentially repeatedly stacked on the stack table.

To this end, the high-speed stacking apparatus 1 may include a stack table 10, an anode plate feeder 20, an anode plate transfer apparatus 30, a cathode plate feeder 40, a cathode plate transfer apparatus 50, and a separator folder 60.

In the high-speed stacking apparatus 1, the stack table 10 may be disposed at the center, and the anode plate feeder 20 and anode plate transfer apparatus 30 and the cathode plate transfer apparatus 50 and cathode plate feeder 40 may be symmetrically disposed with the stack table 10 therebetween. The separator folder 60 may be spaced over apart from the stack table 10. The anode plate transfer apparatus 30 and the cathode plate transfer apparatus 50 are disposed at different positions but may have substantially the same structure. Hereafter, it should be understood that "an apparatus for picking and placing battery cell elements" or "an electrode transfer apparatus" means any one of the anode plate transfer apparatus 30 and the cathode plate transfer apparatus 50.

The stack table 10 is configured such that cathode plates A and anode plates B are alternately stacked on the top thereof facing the separator folder 60, and for example, may be formed in a table shape. The stack table 10 may be configured to move up/or down, and for example, may be configured to moved up and down by a well-known actuator, such as a cylinder or a motor, which is connected to the stack table 10 under the stack table 10. Since cathode plates A and anode plates B are alternately stacked on the stack table 10 with the separator C therebetween, it is possible to prevent interference with the separator folder 60 to be described below only when the stack table 10 is moved down by the thickness of the stacked materials A, B, and C. The top of the stack table 10 on which cathode plates A and anode plates B are stacked is called a stacking surface 110.

The stack table 10 does not specifically straightly (in an x-axis direction) or rotationally reciprocate toward the anode plate feeder 20 and the cathode plate feeder 40 in the stacking process by the high-speed stacking apparatus 1 for battery cell elements. That is, the stack table 10 can be always fixed at a predetermined position.

Since the stack table 10 is fixed at a predetermined position in the stacking process, as described above, the following advantage can be generated.

First, if electrodes A and B are stacked while the stack table 10 rotationally reciprocates, the electrodes A and B stacked thereon may slide due to inertia when the stack table 10 stops and changes the direction, whereby there is a possibility of misarrangement. Further, even if electrodes A and B are stacked while the stack table 10 straightly reciprocates, the stacked electrodes A and B may slide due to inertia when the stack table 10 stops and changes the direction, whereby there is a possibility of misarrangement. In order to prevent this problem, the stack table 10 according to an embodiment of the present disclosure is characterized by only moving up or down without rotating or laterally straightly reciprocate in a stacking process.

The anode plate feeder 20, which is a component that feeds anode plates B to the anode plate transfer apparatus 30, for example, can seat an anode plate B on the top thereof and feed the anode plate B to the anode plate transfer apparatus 30. If necessary, an anode imaging unit 230 may be disposed under an anode plate seat 210 on which an anode plate B is seated on the top of the cathode plate feeder 20, whereby the anode plate feeder 20 can align the anode plate B on the seat 210, but this configuration is not specifically limited. The imaging unit 230, for example, may be a vision camera.

Figure 7:
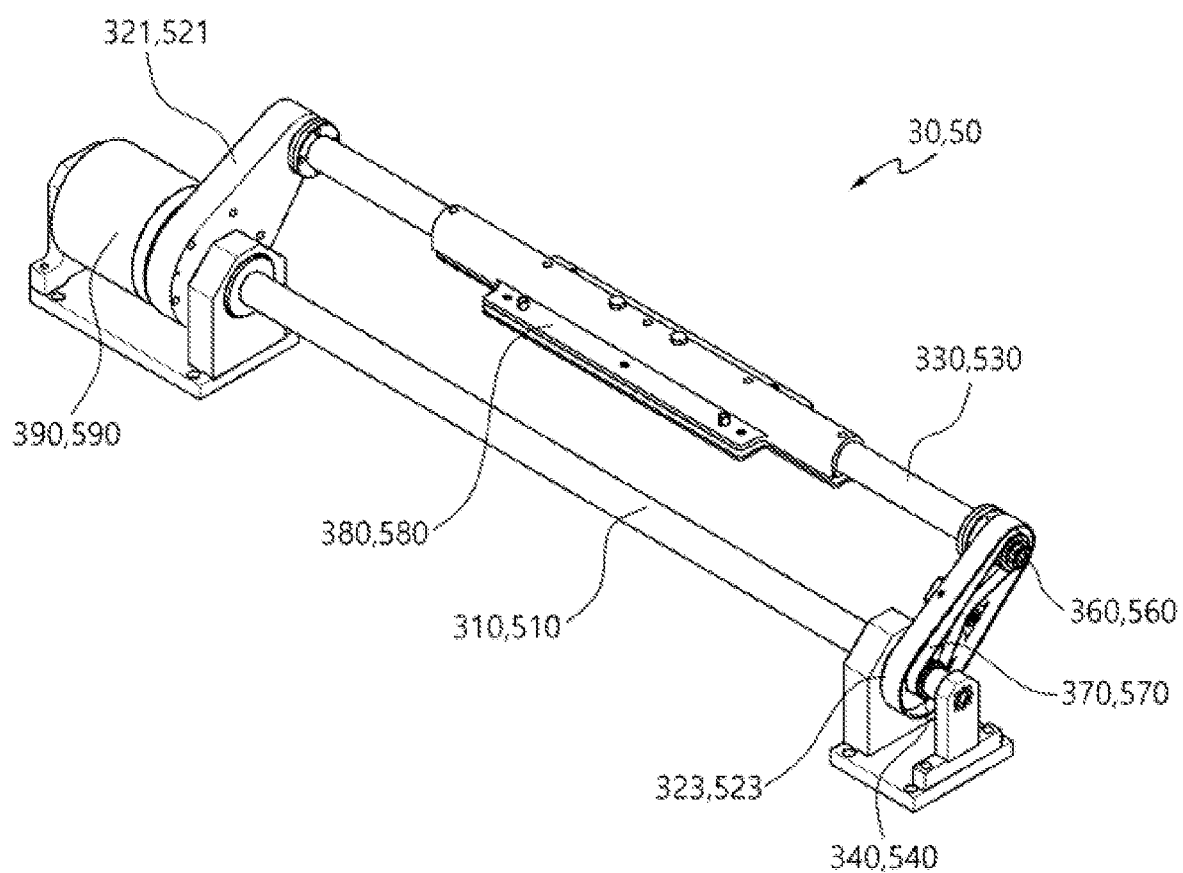
FIG. 7 is a perspective view of an electrode transfer apparatus shown in FIG. 4.
Figure 8:
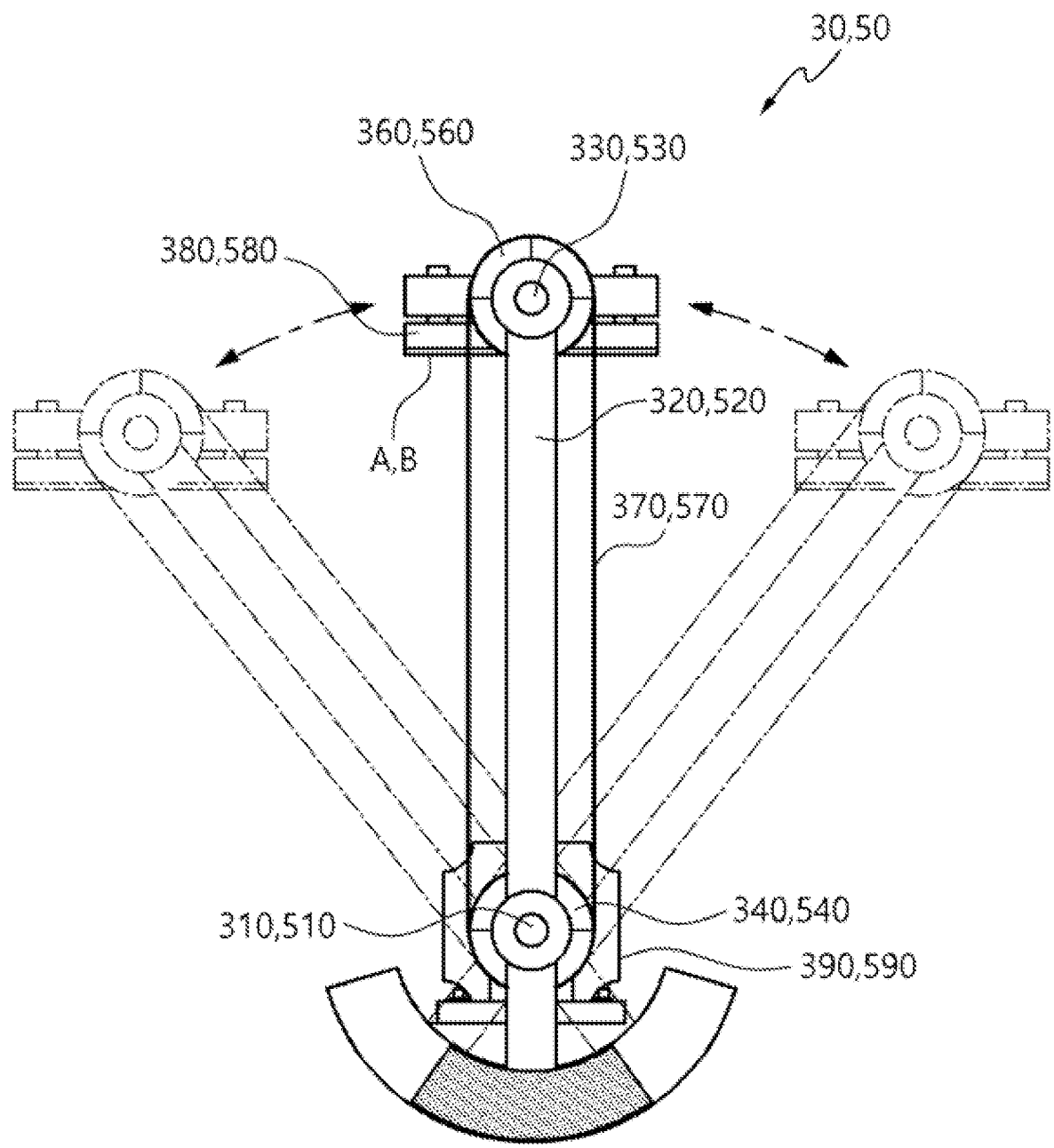
FIG. 8 is a front view of the electrode transfer apparatus shown in FIG. 7.
Figure 9:
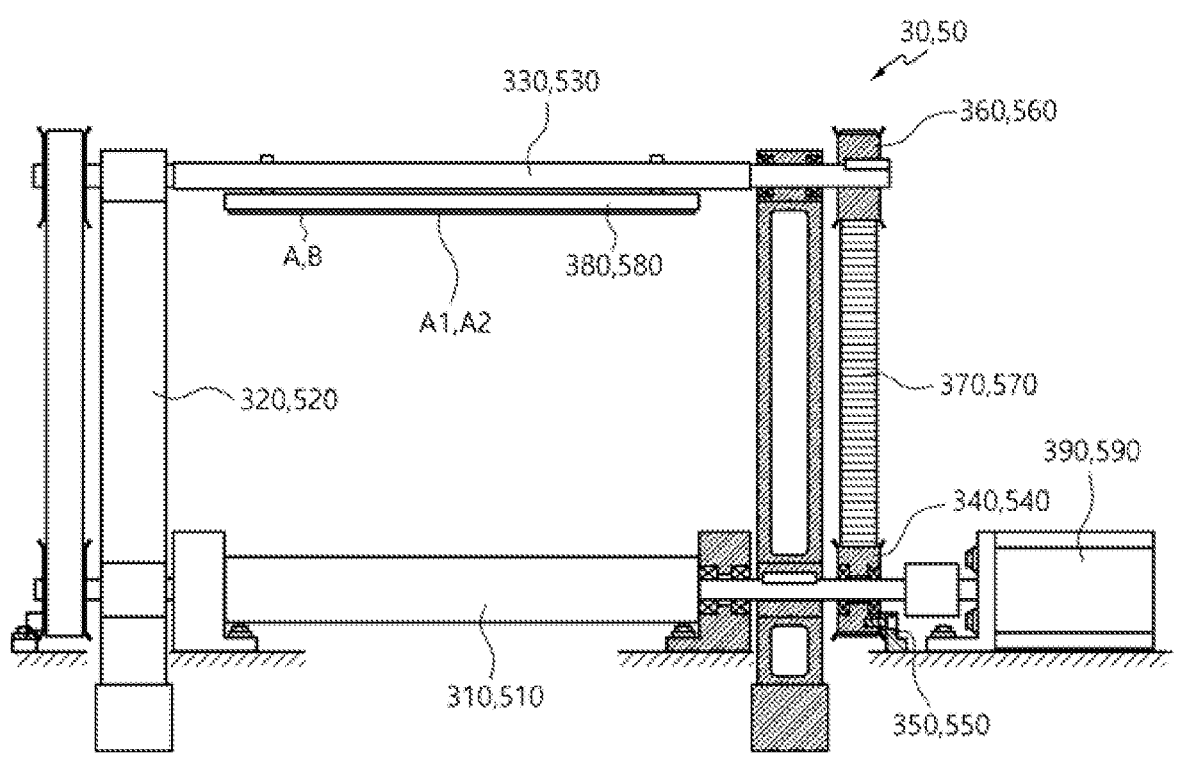
FIG. 9 is a side view of the electrode transfer apparatus shown in FIG. 7.

FIG. 7 is a perspective view of an electrode transfer apparatus shown in FIG. 4, FIG. 8 is a front view of the electrode transfer apparatus shown in FIG. 7, and FIG. 9 is a side view of the electrode transfer apparatus shown in FIG. 7.

Referring to FIGS. 4 to 9, the anode plate transfer apparatus 30 is a component that stacks an anode plate B on the anode plate feeder 20 onto the stack table 10 by rotationally reciprocating between the stack table 10 and the anode plate feeder 20. The anode plate transfer apparatus 30, as shown in FIGS. 8 and 9, may have a weight at the lowermost layer, but it should be noted that the weight is not a necessary component of the present disclosure.

To this end, the anode plate transfer apparatus 30 may include a pivot shaft 310, an operation link 320, a rotary shaft 330, a lower pulley 340, a bracket 350, an upper pulley 360, a belt 370, and a suctioner 380, and an actuator 390. As described above, the cathode plate transfer apparatus 50 may be formed in the same structure as the anode plate transfer apparatus 30, so the cathode plate transfer apparatus 50 is not described in detail.

The pivot shaft 310 is a shaft member that is coupled to a side of the operation link 320, thereby being connected to the actuator 390. For example, the pivot shaft 310 may be connected to the actuator 390 through the lower portion of the operation link 320. The pivot shaft 310 may be disposed through the lower pulley 320 between the operation link 320 and the actuator 390. Alternatively, the end of the pivot shaft 310 that is not coupled to the actuator 390 may be coupled to the lower pulley 340, but which is not limitative. The pivot shaft 310, for example, may be formed in a rod shape.

The operation link 320 is a component that is connected to the pivot shaft 310 and the rotary shaft 330 and is rotationally reciprocated between the stack table 10 and the anode plate feeder 20 by the actuator 390. That is, the operation link 320 is a component that is connected or coupled to the pivot shaft 310 at the lower portion and to the rotary shaft at the upper portion, thereby connecting the pivot shaft 310 and the rotary shaft 330 to each other. For example, the pivot shaft 310 may be disposed through the lower portion of the operation link 320 and the rotary shaft 330 may be disposed through the upper portion of the operation link 320, whereby the shafts may be coupled to each other in this state. The operation link 320 may be provided in a pair spaced apart from each other to be coupled to both ends of the pivot shaft 310 and the rotary shaft 330, respectively, and may be disposed only any one of the ends, but is not limited thereto. The former case can be applied to produce long cells and the later can be applied to produce short cells. The shape of the operation link 320 is not specifically limited.

The rotary shaft 330 is a shaft member that is coupled to another side of the operation link 320 and has the suctioner 380 coupled to a side thereof. For example, the rotary shaft 330 may be disposed through the upper portion of the operation link 320, whereby they may be coupled to each other. Further, the suctioner 380 that suctions and fixes an anode plate B may be coupled to the bottom of the rotary shaft 330. That is, a side of the rotary shaft 330 may be used as a structure for supporting the suctioner 380. The rotary shaft 330, for example, may be formed in a rod shape.

The lower pulley 340 is a component that is disposed on the outer surface of the pivot shaft 310 and has a bearing inserted therein to rotate individually from the pivot shaft 310. The lower pulley 310 is characterized by being installed and fixed regardless of rotation of the pivot shaft 310 by the bracket 350 fixed to the ground. For example, the lower pulley 330 may be disposed at each of positions close to both ends of the pivot shaft 310, or may be disposed only at an end of the pivot shaft 310, but the present disclosure is not limited thereto.

The upper pulley 360 is a component that is disposed on the outer surface of the rotary shaft 330 to rotate with the rotary shaft 330. That is, unlike the lower pulley 340 fixed regardless of the pivot shaft 310, the upper pulley 360 may be configured to be able to rotate with the rotary shaft 330. The pitch circle diameters (P.C.D) of the lower pulley 340 and the upper pulley 360 may be substantially the same such that the rotation angles of the pulleys coincide with each other, but the present disclosure is not limited thereto. For example, the upper pulley 330 may be disposed at each of positions close to both ends of the rotary shaft 330, or may be disposed only at an end of the rotary shaft 330, but the present disclosure is not limited thereto.

The belt 370, which is a component connecting the lower pulley 340 and the upper pulley 360 to each other, may be provided in a pair spaced apart from each other at the left and right sides, or may be disposed only at one side. For example, the belt 370 may be disposed only at the upper and lower pulleys 340 and 360 that are far from the actuator 390.

The suctioner 380, which is a component coupled to the rotary shaft 330 to suction an anode plate B, for example, may be configured in a plate shape to vacuum-suction an anode plate B. As for the type of coupling the suctioner 380 to the rotary shaft 330, the suctioner 380 may be coupled to the bottom of the rotary shaft 330 or the rotary shaft 330 may be disposed through the suctioner 380 to be coupled thereto, but the present disclosure is not limited thereto.

By configuring the electrode transfer apparatuses 30 and 50 in this way, the following advantages can be generated.

First, in the electrode transfer apparatuses 30 and 50 according to an embodiment of the present disclosure, the pivot shafts 310 and 510 that are lower hinge shafts of the operation links 320 and 520 are fixed to the operation links 320 and 520 and then connected to the actuators 390 and 590. The lower pulleys 340 and 540 are fixed regardless of the pivot shafts 310 and 510 by the fixing brackets 350 and 550, and the upper pulleys 360 and 560 have the same pitch circle diameter (P.C.D) as the lower pulleys 340 and 540, so the rotation angles of the pulleys 340 and 360 and 540, 560 are the same.

Accordingly, even though the pivot shafts 310 and 510 and the operation links 320 and 520 are rotated by the actuators 390 and 590, the suctioners 380 and 580 connected to the upper pulleys 360 and 560 can maintain the initially set angle, for example, an angle to be parallel with the ground. Since the suctioner 380 of the electrode transfer apparatuses 30 and 50 can rotationally reciprocate clockwise or counterclockwise through only one operation, there is no sequential operation such as specific moving up/down or lateral moving. That is, it is possible to implement two individual operations through one operation. Accordingly, a cathode plate and an anode plate B can be transferred at a high speed In order to transfer long cells, a pair of operation links 320 or 520 are spaced apart from each other at the left and right sides in the electrode transfer apparatuses 30 and 50 according to the present disclosure such that moving and stopping can be stably performed without vibration, as compared with when the rotary shafts 330 and 350 and the suctioners 380 and 580 are formed like a cantilever, whereby there is an advantage that more delicate stacking is possible.

Further, since the actuators 390 and 590 and the components connected to the actuators 390 and 590 are disposed at the lower portions of the electrode transfer apparatuses 30 and 50, there is an advantage that it is possible to easily secure a visual field for a worker.

Hereafter, the structure of the actuator 390 is described in detail.

The actuator 390 is a component that operates to rotationally reciprocate the operation link 320. The actuator 390 is coupled to a side of the operation link 320, and for example, may be coupled to the outer surface of the operation link 320. When the operation link 320 is provided in a pair, the actuator 390 may be coupled to only any one operation link 321. In addition to the actuator 390, the pivot shaft 310 and the lower pulley 340 are disposed under the anode plate seat 210 of the anode plate feeder 20, thereby enabling a worker to easily secure a visual field and easily approach the apparatus, and then, contributing to convenient maintenance.

The lower pulley 340, the upper pulley 360, and the belt 370 may not be provided at the operation link 321 to which the actuator 390 is coupled. That is, the lower pulley 340, the upper pulley 360, and the belt 370 may be disposed only at the operation link 323 to which the actuator 390 is not coupled.

Figure 10:
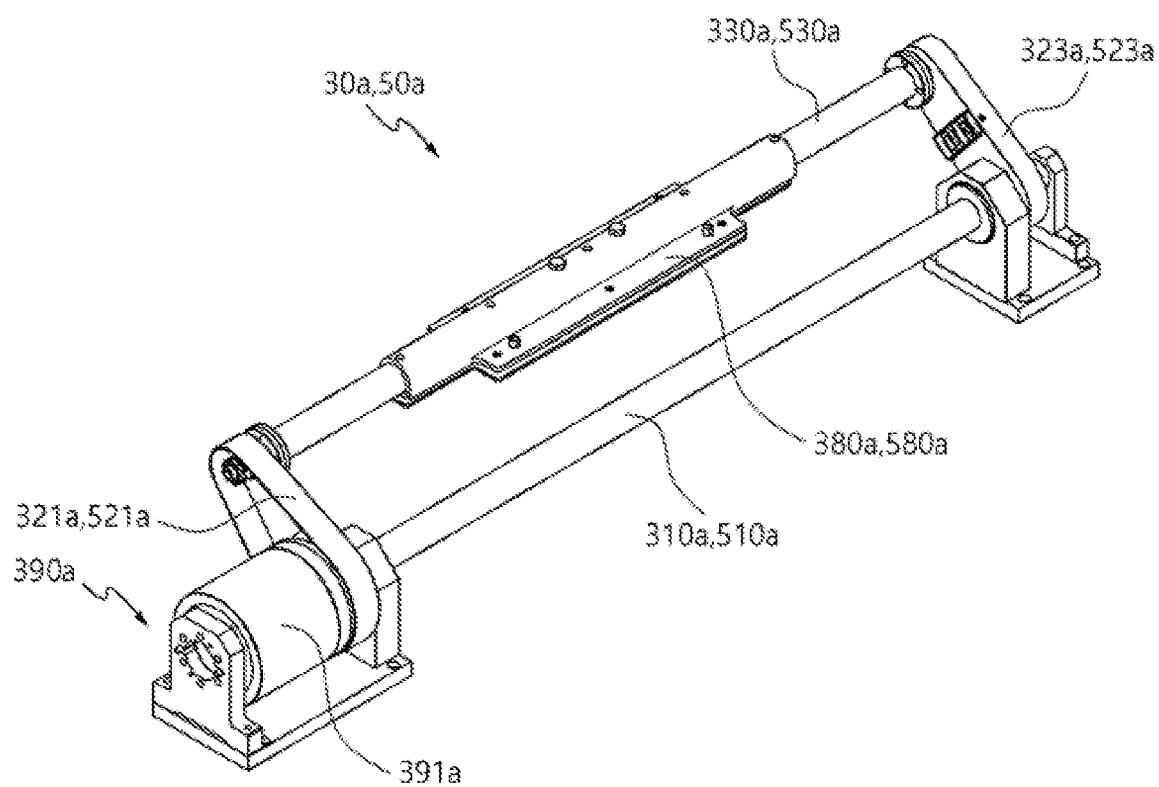
FIG. 10 is a perspective view of an actuator according to a first embodiment of the present disclosure.
Figure 11:
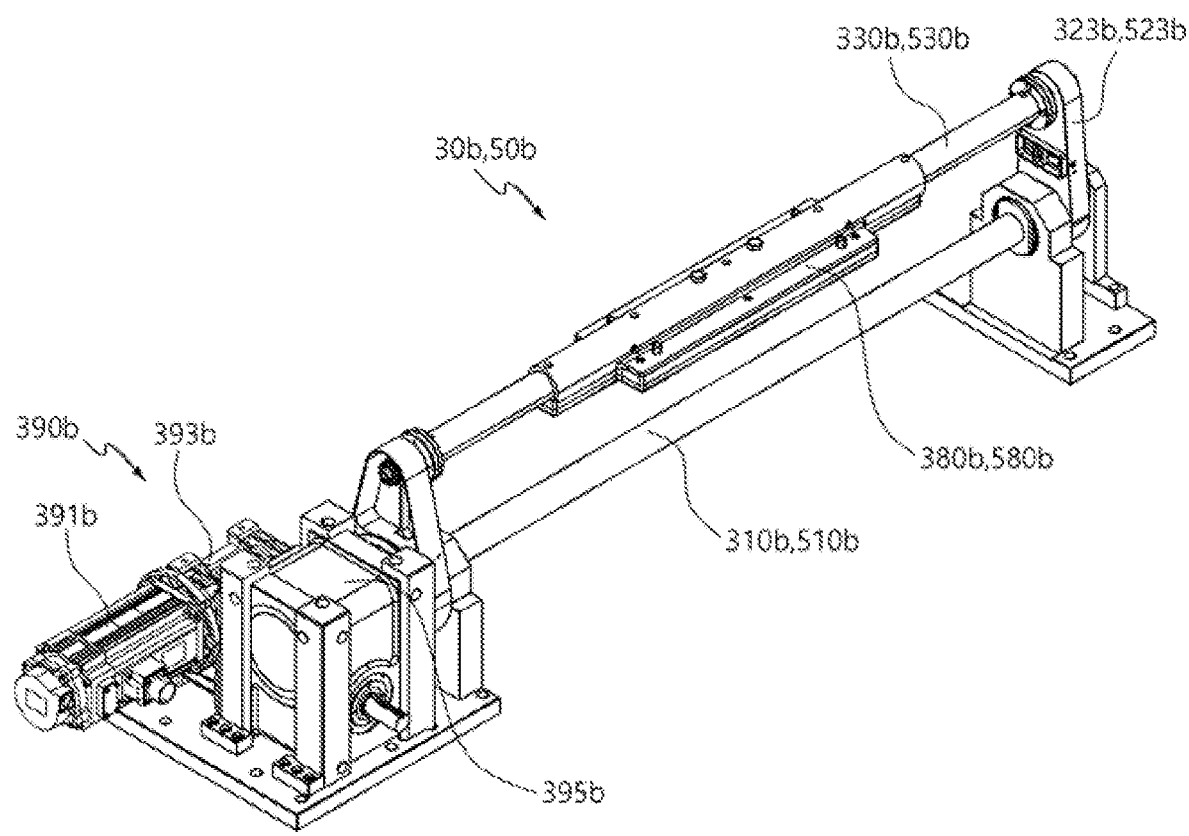
FIG. 11 is a perspective view of an actuator according to a second embodiment of the present disclosure.

FIG. 10 is a perspective view of an actuator according to a first embodiment of the present disclosure and FIG. 11 is a perspective view of an actuator according to a second embodiment of the present disclosure.

Referring to FIG. 10, as a first embodiment, an actuator 390a may be a Direct Drive (DD) servo motor. In this case, the outer surface 391a of the actuator 390a rotates, whereby an operation link 321a coupled to the outer surface 391a can rotate together. The operation link 321a and the actuator 390a may be couple to each other by any fastener such as a bolt. Since a lower pulley 340a, an upper pulley 360a, and a belt 370a connected to the pulleys 340a and 360 are disposed at an operation link 323a spaced apart from the operation link 321a coupled to the actuator 390a, a suctioner 380a can keep being parallel with the ground when rotationally reciprocating. The actuator 390a is directly connected to the operation link 321a without a specific component such as a coupler.

Referring to FIG. 11, as a second embodiment, an actuator 390b may include a rotary motor 391a, a reducer 393b, and a cam-typed oscillating type index drive 395b. The oscillating type index drive 395b is a device that reciprocates an output shaft using an input shaft that continuously rotate at a constant speed. The index drive 395b using a cam mechanism in this way may be coupled to an operation link 321b such that the operation link 321b rotationally reciprocates.

The index drive 395b is directly connected to the operation link 321b without a specific coupler. In this case, a lower pulley 340b, an upper pulley 360b, and a belt 370b may be disposed only at an operation link 323b spaced apart from the operation link 321b coupled to the index drive 390b. The reducer 393b is coupled between the rotary motor 391b and the index drive 395b, but it should be noted that the reducer 393b is not a necessary component of the present disclosure.

Hereafter, the advantages when the actuator 390a according to the first embodiment and the actuator 390b according to the second embodiment are directly connected to the operation links 321a and 321, respectively, are described with respect to comparative examples 1 and 2.

Figure 12:
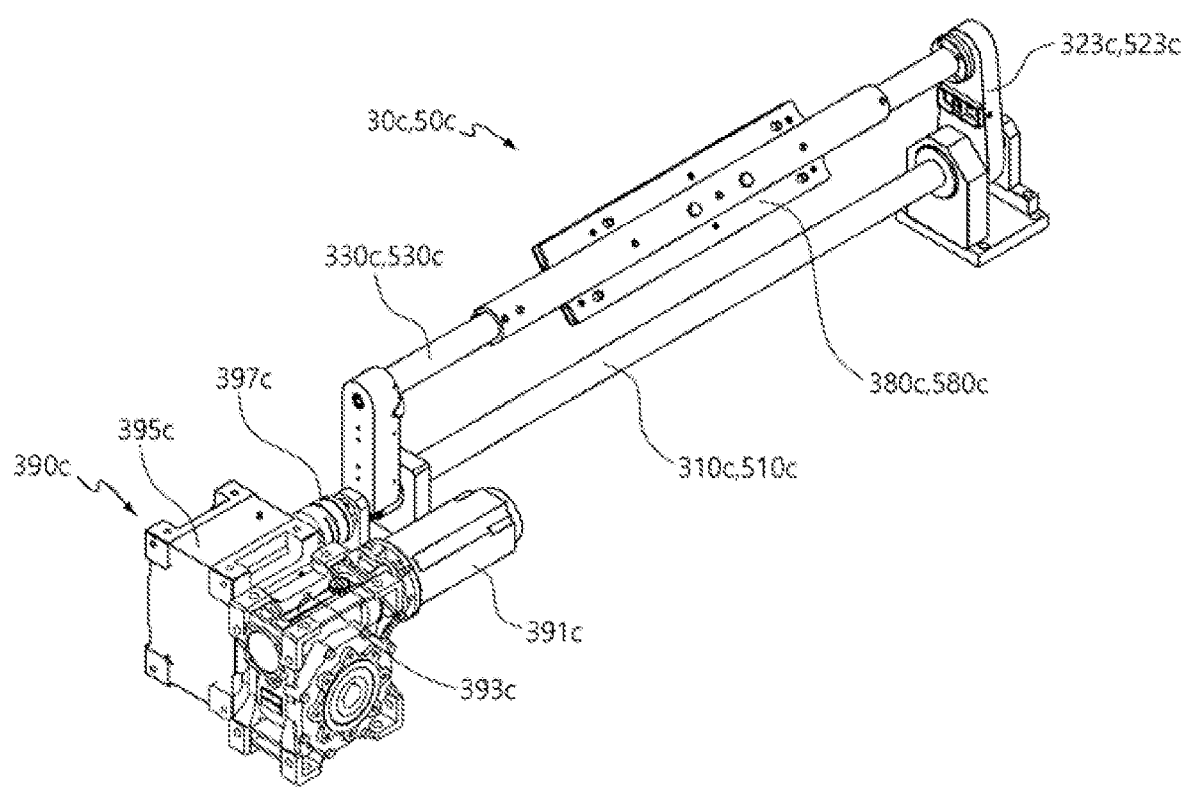
FIGS. 12 and 13 are a comparative example 1 and a comparative example 2 of an actuator.
Figure 13:
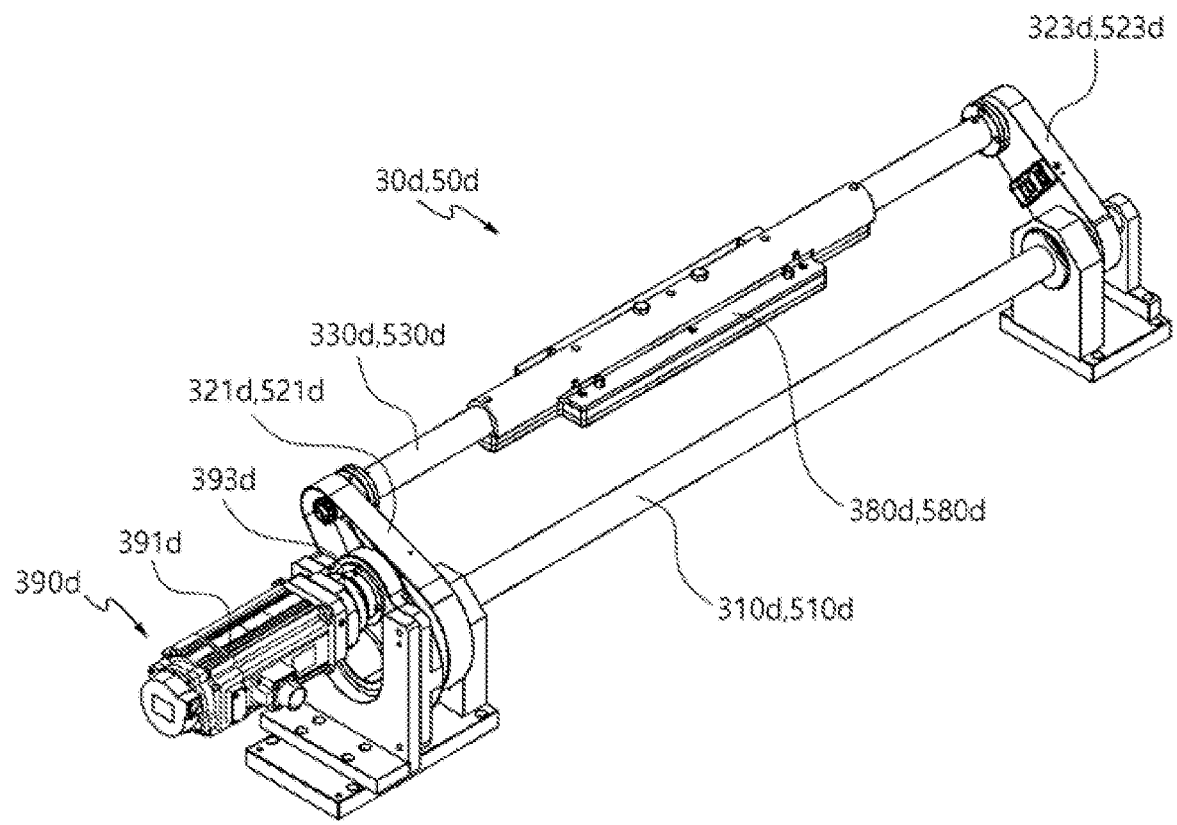

FIGS. 12 and 13 are a comparative example 1 and a comparative example 2 of an actuator.

Comparative Example 1

Referring to FIG. 12, it is the same as the second embodiment that an actuator 390c includes a rotary motor 391c, a reducer 393c, and an index drive 395c using a cam mechanism, but the index drive 395c is connected to a pivot shaft 310c not directly, but through a specific coupler 397c. That is, the actuator 390c is not directly connected to a pivot shaft 310a and an operation link 321c.

Comparative Example 2

Referring to FIG. 13, an actuator 390d including a motor 391d is indirectly connected to an operation link 321d through a reducer 393d. That is, a side of the reducer 391d is coupled to the actuator 390d and another side thereof is coupled to the operation link 321d.

When the actuators according to the first and second embodiments and the comparative examples 1 and 2 are operated and a suctioner is correspondingly rotationally reciprocates, particularly, when the suctioner reaches the electrode feeders 30 and 50 from the stack table 10 or reaches the stack table 10 from the electrode feeders 30 and 50, it is required to minimize a Total Around Cycle Time (TACT) or a cycle time and prevent vibration of the suctioner for process efficiency. That is, when the suctioner vibrates over a predetermined level, a stacking error of electrodes A and B suctioned to the suctioner is unavoidably generated. Accordingly, the electrodes A and B may be stacked at an angle. That is, the electrodes A and B are misarranged.

The TACT is the time for which one cathode plate A and one anode plate B are stacked on a separator C on the stack table 10, and target TACT is 0.4 seconds. Accordingly, a target reciprocation time of the electrode feeders 30 and 50 is 0.8 seconds.

Figure 14A:
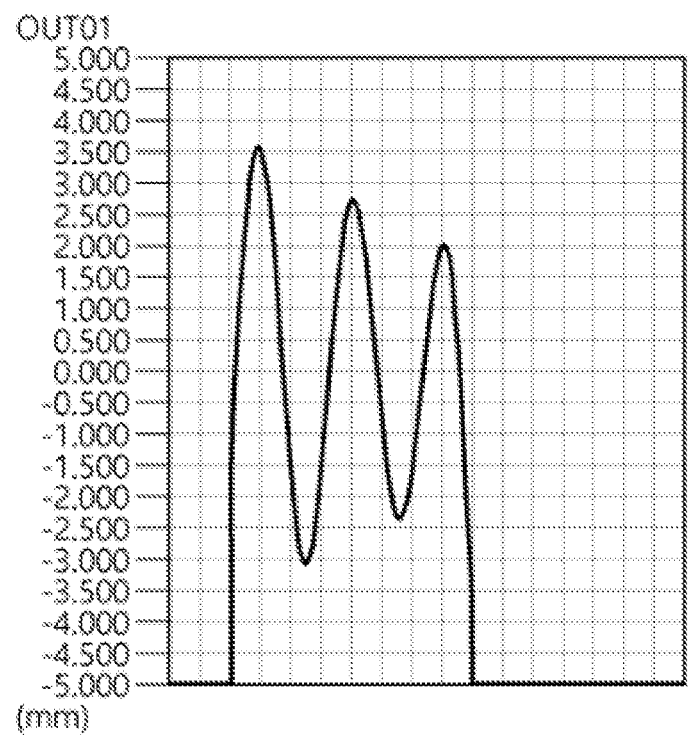
FIGS. 14A and 14B are graphs for comparing maximum amplitudes in the operation processes of the comparative example 1 and the comparative example 2.
Figure 14B:
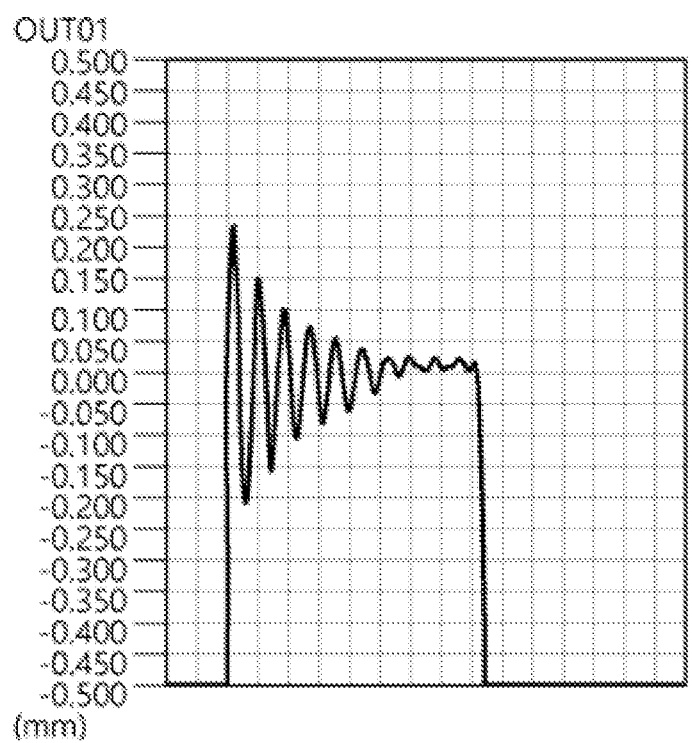
Figure 15A:
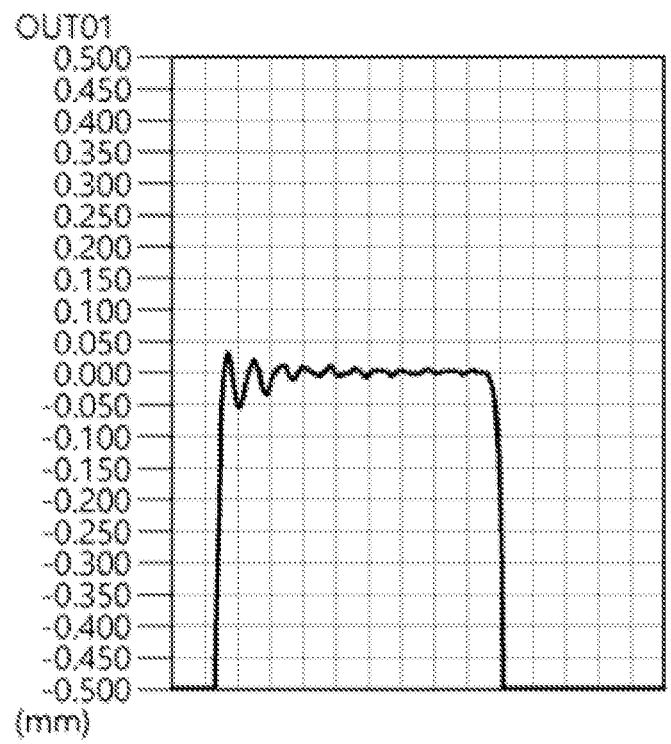
FIGS. 15A and 15B are graphs for comparing maximum amplitudes in the operation processes of the first embodiment and the second embodiment of the present disclosure.
Figure 15B:
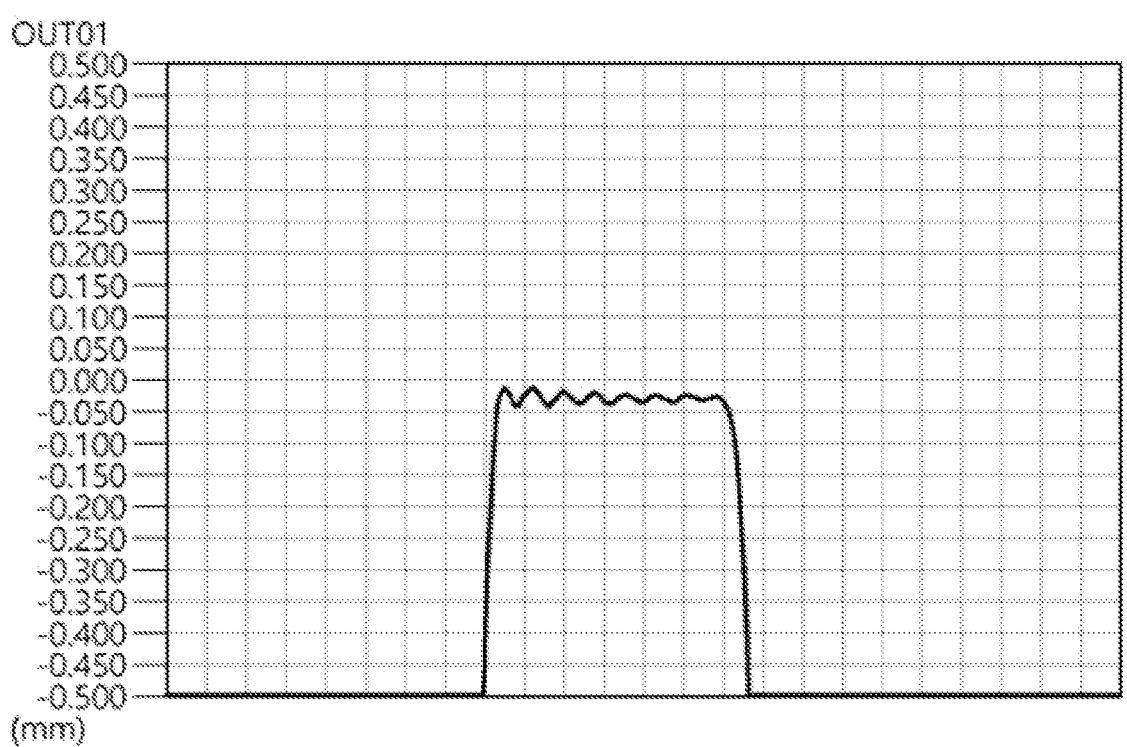

FIGS. 14A and 14B are graphs for comparing maximum amplitudes in the operation processes of the comparative example 1 and the comparative example 2 and FIGS. 15A and 15B are graphs for comparing maximum amplitudes in the operation processes of the first embodiment and the second embodiment of the present disclosure.

Referring to FIG. 14A, it can be seen that when TACT is 0.4, the magnitude of the maximum amplitude of the suctioner 380c is about 6.66 mm in the comparative example 1. Referring to FIG. 14B, it can be seen that when TACT is 0.4, the magnitude of the maximum amplitude of the suctioner 380d is about 0.44 mm in the comparative example 2.

Further, referring to FIG. 15A, it can be seen that when TACT is 0.4, the magnitude of the maximum amplitude of the suctioner 380a is about 0.088 mm in the embodiment 1. Accordingly, it can be seen in the embodiment 1 that the magnitude of the maximum amplitude remarkably decreased in comparison to that in the comparative example 1, and the magnitude of the maximum amplitude decreased by about 37.6% in comparison to the comparative example 2. Accordingly, it is possible to minimize misarrangement of electrodes A and B and corresponding processor errors by remarkably reducing vibration in the stacking process in the embodiment 1 in comparison to the comparative examples 1 and 2.

Finally, referring to FIG. 15B, it can be seen in the embodiment 2 of the present disclosure that when TACT is 0.4, the magnitude of the maximum amplitude of the suctioner 380b is about 0.031 mm. Accordingly, it is also possible in the embodiment 2 to minimize misarrangement of electrodes A and B and corresponding processor errors by remarkably reducing vibration in the stacking process in comparison to the comparative examples 1 and 2.

Referring to FIGS. 4 to 6, the cathode plate feeder 40, which is a component that feeds cathode plates A to the cathode plate transfer apparatus 50, can seat a cathode plate A on the top thereof and feed the cathode plate A to the cathode plate transfer apparatus 50. If necessary, a cathode imaging unit 450 may be disposed under a cathode plate seat 410 on which a cathode plate A is seated on the top of the cathode plate feeder 40, whereby the cathode plate feeder 40 can align the cathode plate B on the seat 410, but this configuration is not specifically limited. The imaging unit 430, for example, may be a vision camera.

Figure 16:
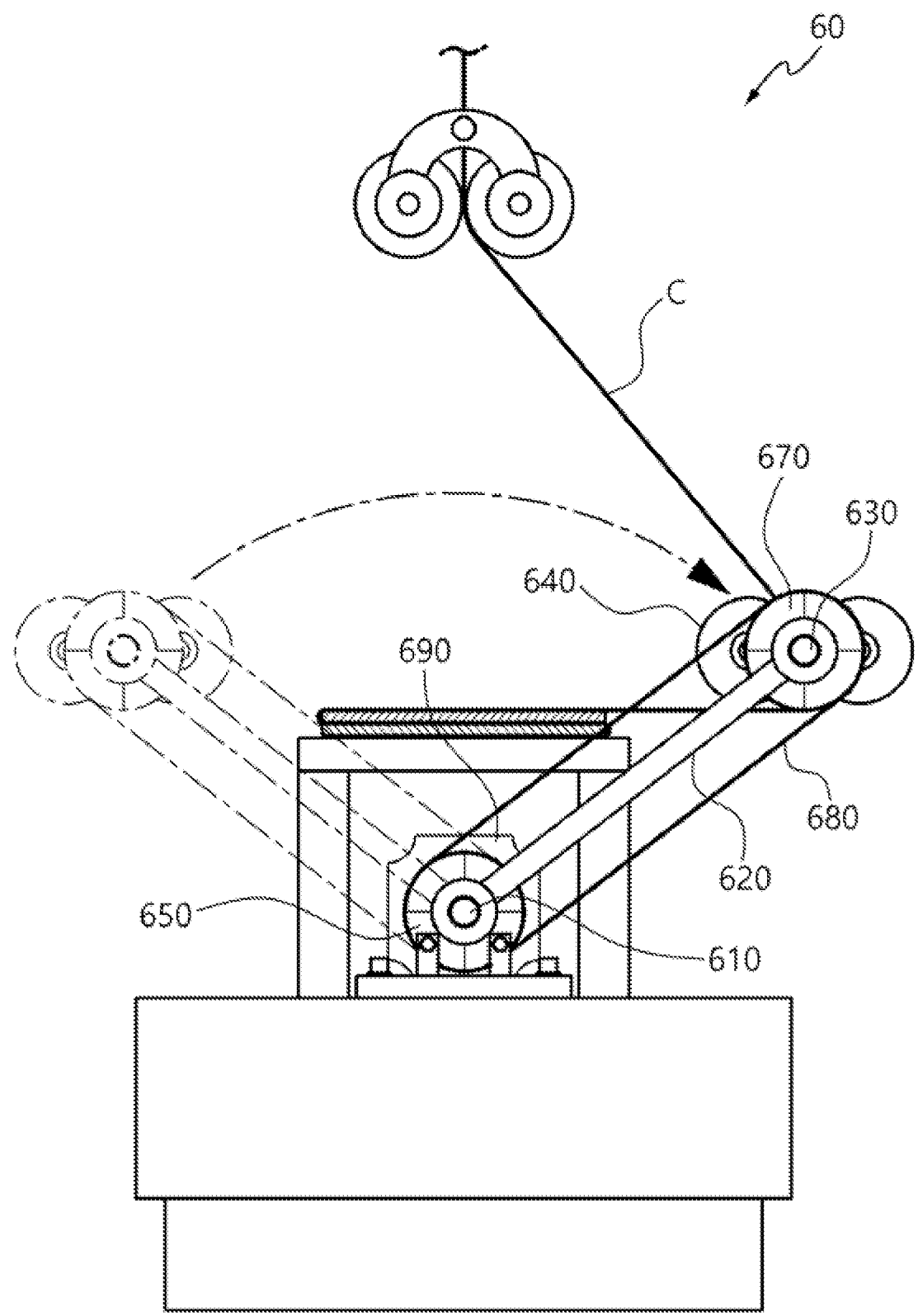
FIG. 16 is a front view of a separator folder (first embodiment) shown in FIG. 4.
Figure 17:
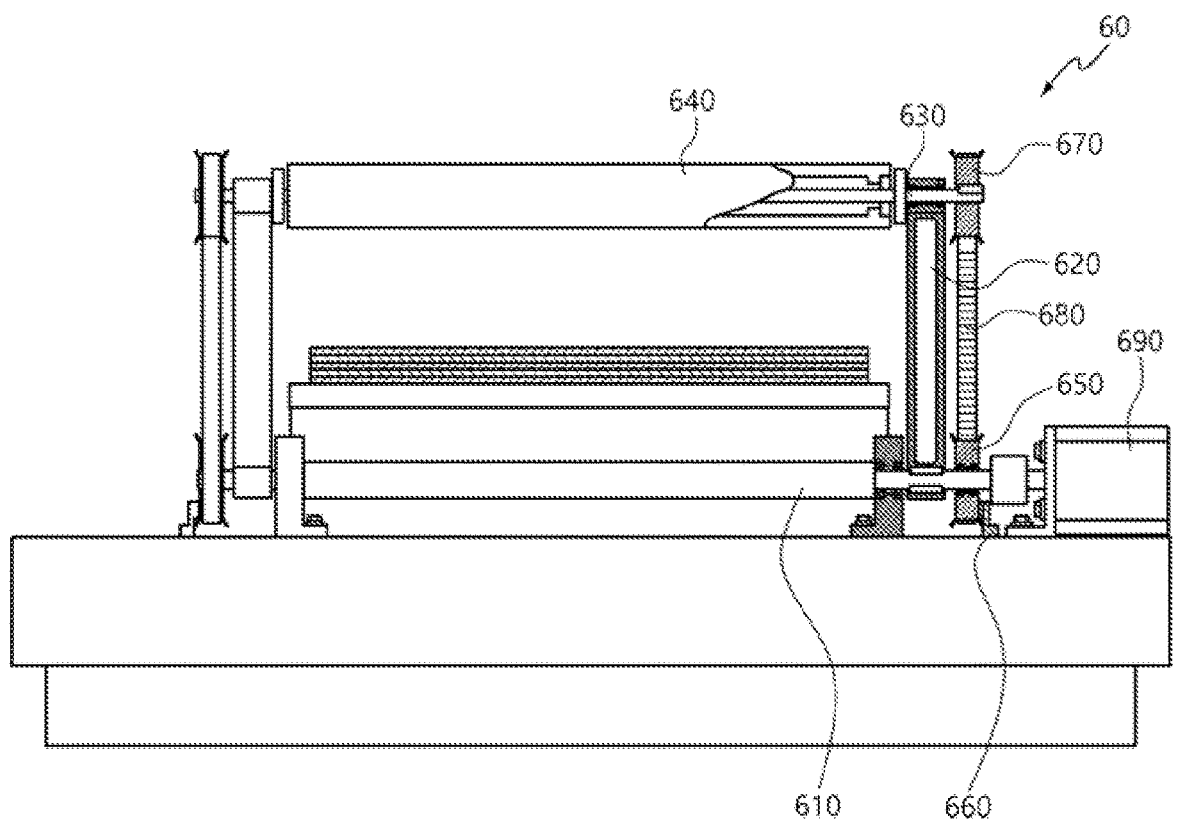
FIG. 17 is a side view of the separator folder shown in FIG. 16.

FIG. 16 is a front view of a separator folder shown in FIG. 4 and FIG. 17 is a side view of the separator folder shown in FIG. 16.

Referring to FIGS. 16 and 17, a separator folder 60 is a component that folds a separator C, which is fed from above the stack table 10, in a zigzag manner such that cathode plates A and anode plates B are alternately stacked on the separator C on the stack table 10.

To this end, the separator folder 60 may include a reciprocating pivot shaft 610, a reciprocation link 620, a hinge shaft 630, a guide roller 640, a lower pulley 650, a bracket 660, an upper pulley 670, a belt 680, and a roller rotator 690.

The reciprocating pivot shaft 610, the reciprocation link 620, the lower pulley 650, the bracket 660, the upper pulley 670, the belt 680, and the roller rotator 690 are substantially the same as the pivot shaft 310, the operation link 320, the lower pulley 340, the bracket 350, the upper pulley 360, the belt 370, the suctioner 380, and the actuator 390 described above, so they are not described in detail. The reciprocating pivot shaft 610, the lower pulley 650, and the bracket 660 may be disposed under the stacking surface 110 so that a worker can easily secure a visual field and can easily approach the electrodes A and B in the stacking process. That is, the guide roller 640 positioned over the stacking surface 110 through the reciprocation link 620 can configured to rotationally reciprocate over the stacking surface 110. In this case, the guide roller 640 may rotationally reciprocate at an appropriate height not to interfere with up-down movement of the stacking surface 110.

The reciprocating pivot shaft 610 of the separator folder 60 may be disposed under the stacking surface for electrodes A and B of the stack table 10 so that a worker can easily secure a visual field. Accordingly, the lower pulley 650, the bracket 660, and the roller rotator 690 that are horizontally coupled to the reciprocation pivot shaft 610 all may be disposed under the stacking surface for electrodes A and B of the stack table 10.

The hinge shaft 630 is a shaft member that is coupled to the upper portion of the reciprocation link 620, the upper pulley 670, and the guide roller 640.

The guide roller 640 is provided in a pair connected to the upper of the reciprocation link 620 to guide a separator C that is fed therebetween. The guide rollers 640 may be coupled to the reciprocation link 620 and the upper pulley 670 through the hinge shaft 630. According to this configuration, when the reciprocation link 620 is rotated to the left and right with respect to the stack table 10 by the roller rotator 690, the guide rollers 640 are also rotated, whereby the separator C that is fed can be fed in a zigzag manner on the stack table 10.

The roller rotator 690, for example, may be a direct drive motor (DD motor), but is not limited thereto.

Figure 18:
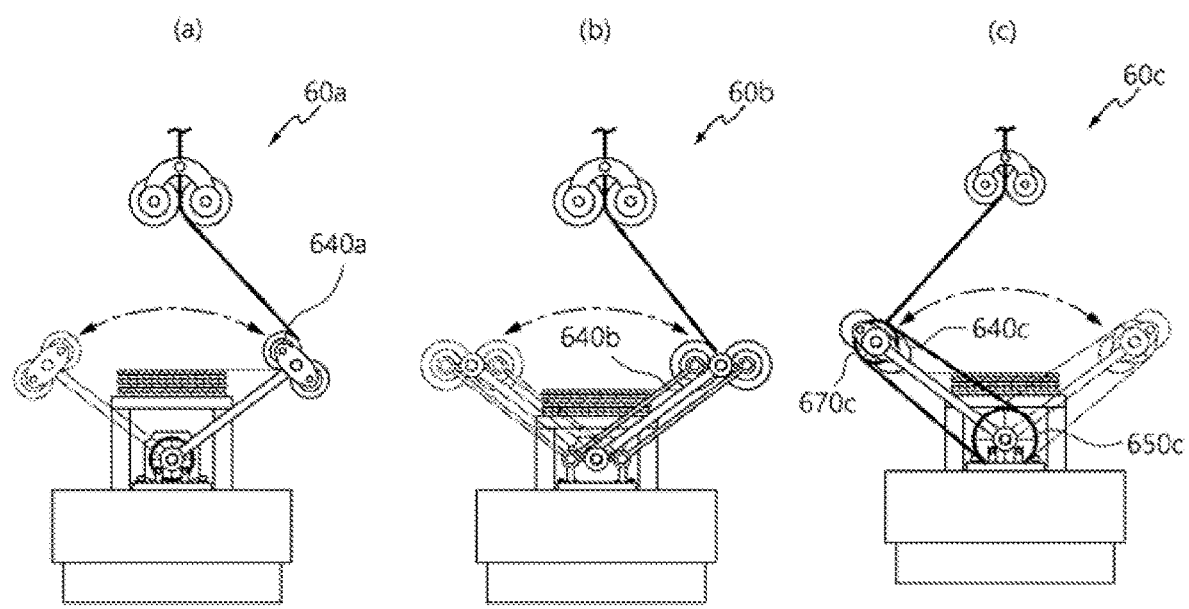
FIGS. 18A to 18C are reference views of separator folders according to second to fourth embodiments of the present disclosure.

FIGS. 18A to 18C are reference views of separator folders according to second to fourth embodiments of the present disclosure.

Referring to FIG. 18A, as in the second embodiment, guide rollers 640a are directly connected to the upper end of a reciprocation link 620a without a lower pulley 650a and an upper pulley 670a to keep being parallel with the ground, but there is no problem with the operation even in this case. Alternatively, referring to FIG. 18B, a 4-bar link may be applied as a third embodiment such that guide rollers 640b keep being parallel with the ground. Further, referring to FIG. 18C, the pitch circle diameter (P.C.D) of a lower pulley 650c may be set larger than the pitch circle diameter (P.C.D) of an upper pulley 670c such that the rotation angle of a reciprocation link 620c decreases in comparison to the first embodiment, thereby being able to increase the speed of the stacking process.

The above detailed description exemplifies the present disclosure. Further, the description provides an embodiment of the present invention and the present invention may be used in other various combination, changes, and environments. That is, the present invention may be changed or modified within the scope of the present invention described herein, a range equivalent to the description, and/or within the knowledge or technology in the related art. The embodiment shows an optimum state for achieving the spirit of the present invention and may be changed in various ways for the detailed application fields and use of the present invention. Therefore, the detailed description of the present disclosure is not intended to limit the present disclosure in the embodiment.

What is claimed is:

1. An apparatus for picking and placing battery cell elements including an electrode, the apparatus comprising:
   a pivot shaft having a first end and a second end;
   a rod-shaped rotary shaft parallel to the pivot shaft, having a first end, a second end and a cylindrical surface;
   an operation link comprising a pair of spaced apart operation links respectively coupled to the first and second ends of the pivot shaft and the rotary shaft
   a suctioner coupled to the cylindrical surface of the rotary shaft, wherein the suctioner has a plate shape with a surface configured to vacuum-suction the electrode, the surface is parallel to a length or axis of the rotary shaft, and the operation link rotates the suctioner clockwise and counterclockwise; and
   an actuator coupled to the pivot shaft and the operation link, configured to rotationally reciprocate the operation link.

2. The apparatus of claim 1, wherein the actuator is directly connected to the operation link.

3. The apparatus of claim 1, wherein the actuator is a direct drive motor (DD motor) and is directly connected to the operation link, and an outer surface of the actuator rotates such that the operation link rotationally reciprocates.

4. The apparatus of claim 1, wherein the actuator comprises a cam-typed oscillating type index drive and is directly connected to the operation link.

5. The apparatus of claim 4, wherein the actuator further includes:
   a rotary motor; and
   a reducer connecting the rotary motor to the index drive.

6. The apparatus of claim 1, further comprising:
   a lower pulley fixed to an outer surface of the pivot shaft;
   an upper pulley configured to rotate with the rotary shaft, on an outer surface of the rotary shaft; and
   a belt connecting the lower pulley to the upper pulley.

7. The apparatus of claim 6, wherein the lower pulley is fixed by a bracket fixed to the ground.

8. The apparatus of claim 6, wherein each of the upper pulley and the lower pulley have a substantially identical pitch circle diameter.

9. The apparatus of claim 8, wherein the suctioner has an initially set angle parallel with the ground and maintains the initially set angle during reciprocal rotation.

10. The apparatus of claim 1, wherein the pivot shaft is connected to the actuator through a lower portion of the operation link, and the rotary shaft is disposed through an upper portion of the operation link.

11. The apparatus of claim 10, wherein the actuator rotates the pivot shaft and the operation link, the pivot shaft functions as a lower hinge shaft of the operation link, and the pivot shaft is fixed to the operation link.

12. The apparatus of claim 1, wherein when the actuator rotates the operation link, the pivot shaft functions as a lower hinge shaft of the operation link.

\* \* \* \* \*